G. W. SAFELY.
LATHE ATTACHMENT.
APPLICATION FILED DEC. 22, 1910.
1,048,891.
Patented Dec. 31, 1912.
3 SHEETS—SHEET 1.
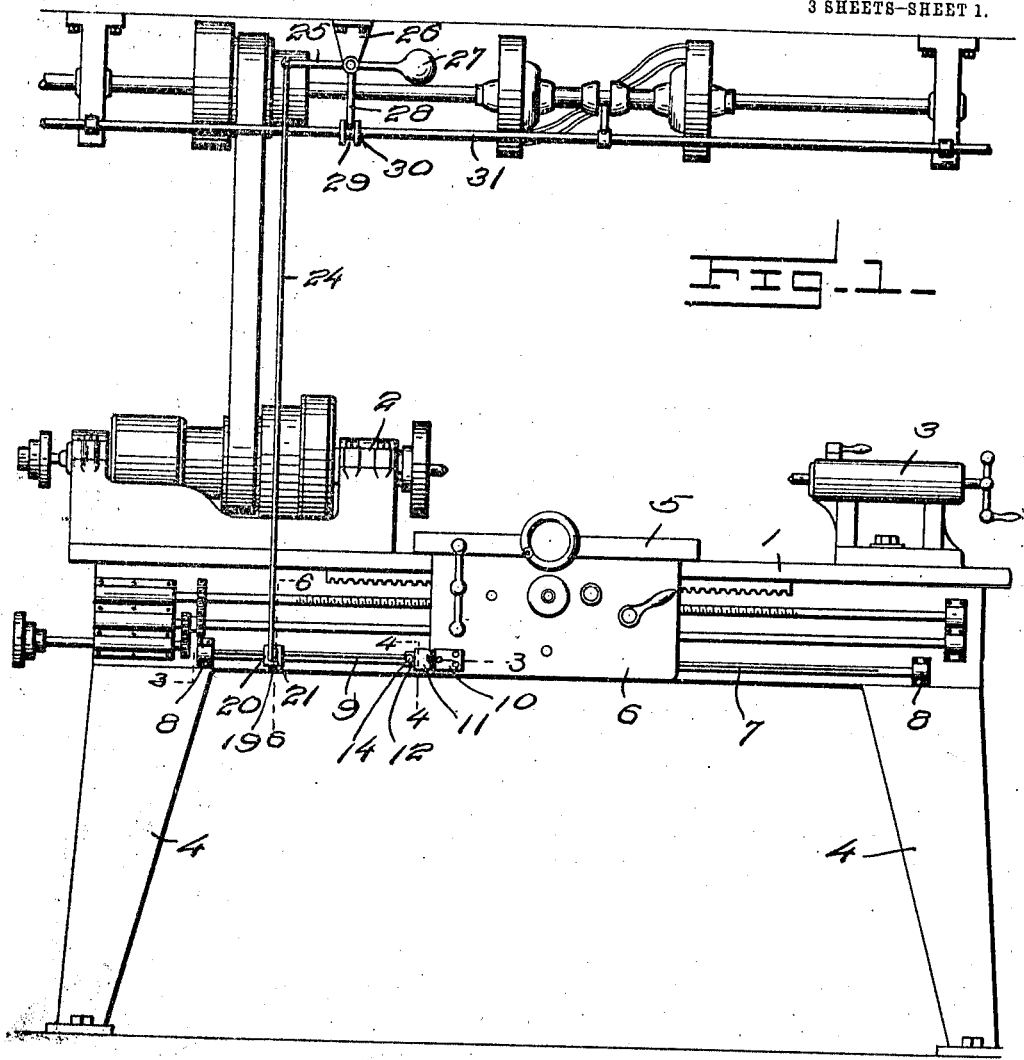

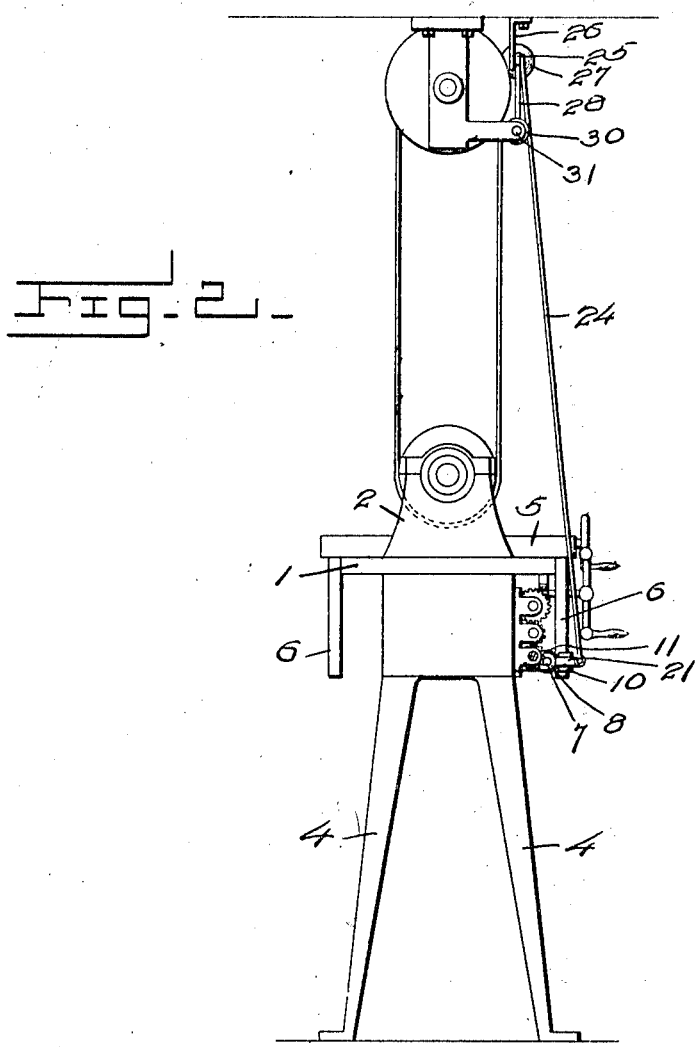
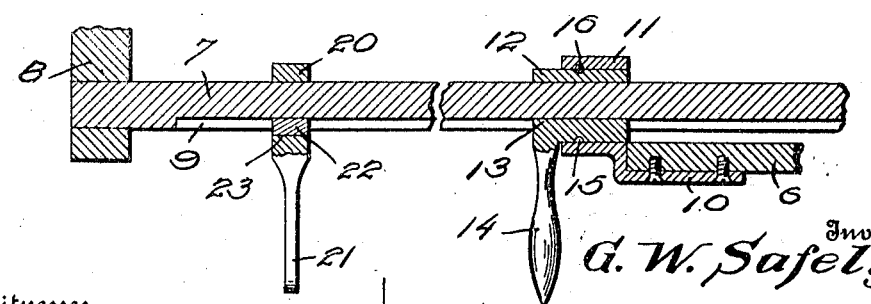

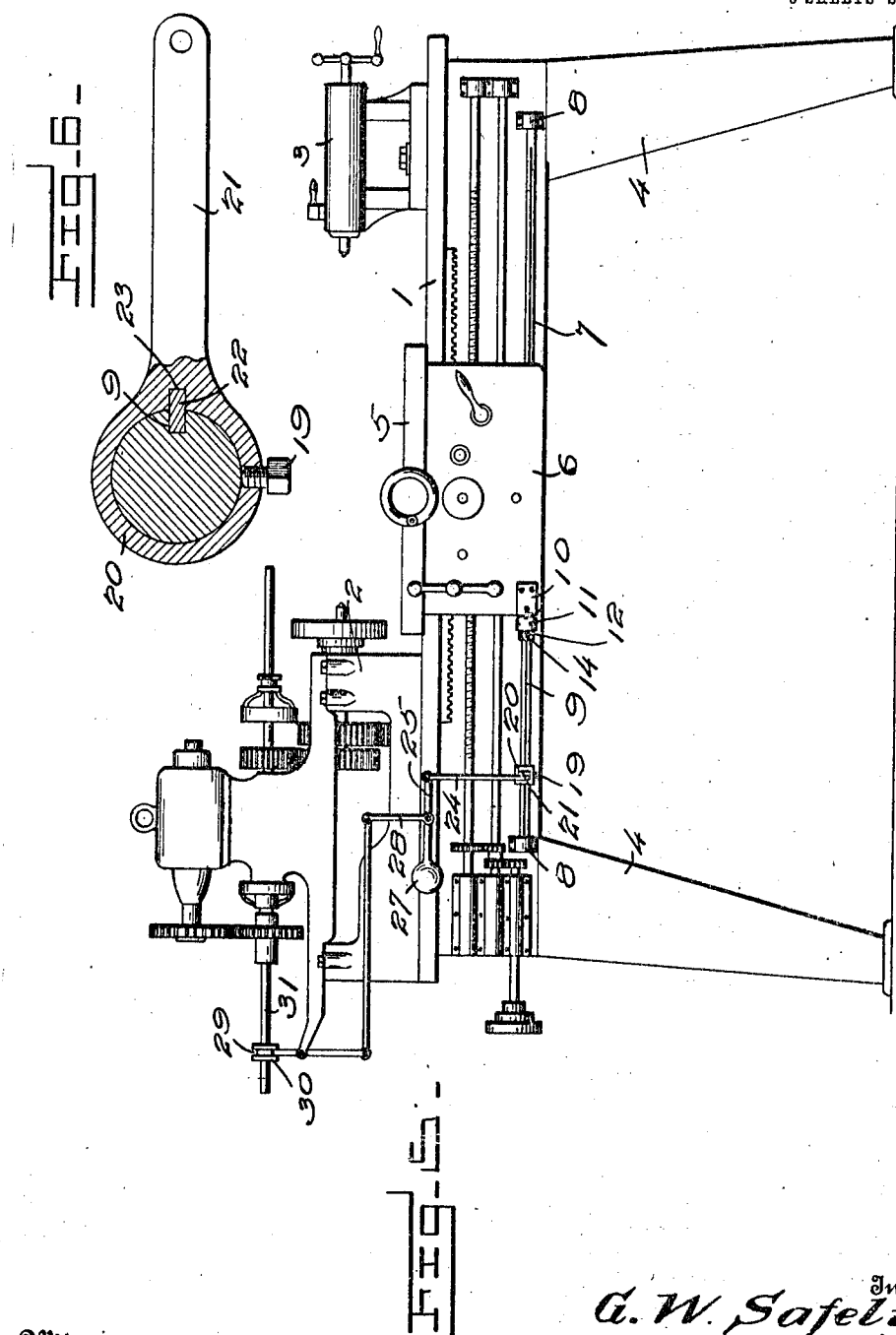

UNITED STATES PATENT OFFICE.

GEORGE W. SAFELY, OF NEW ORLEANS, LOUISIANA, ASSIGNOR OF ONE-HALF TO HENRY A. CUNLIFFE, OF NEW ORLEANS, LOUISIANA.

LATHE ATTACHMENT.

1,048,891.  Specification of Letters Patent.  Patented Dec. 31, 1912.

Application filed December 22, 1910. Serial No. 598,740.

*To all whom it may concern:*

Be it known that I, GEORGE W. SAFELY, a citizen of the United States, residing at New Orleans, in the parish of Orleans and State of Louisiana, have invented certain new and useful Improvements in Lathe Attachments, of which the following is a specification.

This invention relates to lathe attachments, and has for its object to provide a device of this character which may be conveniently attached to any well known lathe.

A further object of the invention is to construct an attachment of this nature which will be in convenient reach of the operator no matter what position the carriage may be.

Other objects and advantages will be apparent from the following description, and it will be understood that changes in the specific structure shown and described may be made within the scope of the claim without departing from the spirit of the invention.

In the accompanying drawings: Figure 1 is a front elevation, showing the device applied to the lathe and usual driving mechanism. Fig. 2 is an end view of a lathe, with the attachment applied. Fig. 3 is a longitudinal sectional view taken on line 3—3 of Fig. 1. Fig. 4 is a vertical view taken on line 4—4 of Fig. 1. Fig. 5 is a front elevation, showing the device applied to a lathe equipped with a direct drive. Fig. 6 is a vertical section on line 6—6 of Fig. 1.

Referring to the drawings, the numeral 1 designates the lathe-bed, and 2 the head stock, and 3 the usual tail stock. The lathe-bed is suitably supported upon standards 4—4. Adapted for longitudinal travel on the bed 1 is the usual carriage 5 having an apron 6. Arranged upon the side of the lathe-bed 1 is a rocking shaft 7 having its opposite ends journaled in bearings 8—8. The shaft 7 is provided with a longitudinal groove 9. Secured to the apron 6 and adapted to travel therewith is a plate 10 having formed integral therewith a tubular member 11. Rotatable within the tubular member 11 is a collar 12 having formed upon its inner surface a lug 13, said lug adapted to project into the groove 9 of the shaft 7. The collar 12 projects sufficiently beyond the tubular member 11 so that a hand lever 14 may be secured thereto, or if desired the hand lever may be integral with the collar 12. The collar 12 is provided with an annular groove 15 adapted to receive a key 16, said key being passed through openings 17—17 formed in the tubular member 11, and may be held against accidental displacement by a cotter pin 18. From this construction it will be seen that the collar 12 may be partially rotated and by means of the lugs 13 engaging the groove 9 the shaft 7 is rocked, and the key 16 will prevent the collar 12 from having endwise movement in relation to the tubular member 11.

Rigidly secured near one end of the shaft 7 by means of a set screw 19 is a collar 20 having formed integral therewith a lever 21. If desired, the collar 20 may be feathered to the shaft 7 by a key 22, said key engaging the groove 9 of the shaft 7 and groove 23 formed in the inner side of the collar 20.

Pivotally connected to the end of the lever 21 is a rod 24 having its opposite end pivoted to a shaft 25, said shaft being pivotally supported in the coiling bracket 26. The shaft 25 is provided with a weight or counterbalance 27. Formed integral with the shaft 25 is an arm 28, the end of which engages the annular groove 29 formed in the collar 30, said collar being rigidly connected to the shift rod 31 of the usual clutch operating mechanism, as clearly shown in Fig. 1 of the drawings. In Fig. 5 the same principle is involved, and shows the attachment operating in conjunction with a direct drive lathe.

From the foregoing description it will be apparent that as the carriage 5 and apron 6 travels upon the lathe-bed 1 the tubular member 11 will travel therewith, and the collar 12 will slide freely upon the shaft 7, and the handle 14 will at all times be in convenient reach of the operator. When it is desired to start, stop or reverse the lathe, it is only necessary that the operator grasps the handle 14 and forces the same upwardly or downwardly, and the shaft 7, by its connection with the lug 13 in the groove 9, will be rocked, and the lever 21 will shift the rod 31 through the counterbalance mechanism to impart proper movement to the lathe.

It will be obvious that the above described mechanism may be readily applied to any type of machine where it is desired to start, stop or reverse the machine, or it may be adapted, by minor changes to shift the driving belts and the like.

What is claimed is:

In combination with a lathe carriage, comprising an apron, a shaft having a longitudinal groove formed therein, and having its ends journaled to the lathe-bed, a plate secured to the apron and adapted to travel therewith, said plate being provided with a tubular member adapted to surround the grooved shaft, a collar rotatably mounted in said tubular member, and having a lug to engage with the groove, alined perforations formed in the tubular member, an annular groove formed in said collar, a key passing through perforations of the tubular member to engage the annular groove of the collar to lock the same against independent longitudinal movement, a handle carried by the collar, a lever rigidly connected to a portion of the grooved shaft, and adapted to be rocked when the handle is operated to shift the usual clutch mechanism.

In testimony whereof I affix my signature, in the presence of two witnesses.

GEORGE W. SAFELY.

Witnesses:
EDWARD MANDAL,
W. B. FORREST.